United States Patent [19]
Sidwell

[11] Patent Number: 5,859,789
[45] Date of Patent: Jan. 12, 1999

[54] ARITHMETIC UNIT

[75] Inventor: Nathan M. Sidwell, St. Werburghs, United Kingdom

[73] Assignee: SGS-Thomson Microelectronics Limited, Almondsbury, United Kingdom

[21] Appl. No.: 677,837

[22] Filed: Jul. 10, 1996

[30] Foreign Application Priority Data

Jul. 18, 1995 [GB] United Kingdom .................... 9514684

[51] Int. Cl.$^6$ .................................................. G06F 9/302
[52] U.S. Cl. .................................... 364/750.5; 364/736.02
[58] Field of Search ................................ 395/800.02, 841, 395/376; 364/748.09, 748.2, 754.01, 754.02, 758, 768, 765, 750.5, 748.07, 736.02, 806

[56] References Cited

U.S. PATENT DOCUMENTS

| | | | |
|---|---|---|---|
| 4,617,625 | 10/1986 | Nagashima | 395/800.04 |
| 4,761,754 | 8/1988 | Kinoshita | 364/736 |
| 4,771,379 | 9/1988 | Hideki et al. | 364/200 |
| 4,888,682 | 12/1989 | Ngai | 364/730 |
| 5,081,573 | 1/1992 | Hall | 395/800.02 |
| 5,446,651 | 8/1995 | Moyse | 364/760 |

OTHER PUBLICATIONS

Standard Search Report issued by the European Patent Office and dated Feb. 13, 1996.
Proceedings Of the 7th IEEE Symposium on Computer Arithmetic, 4–6 Jun. 1985, Urbana, IL, USA, 1985 IEEE Computer Society Press, Los Alamitos CA US, pp. 38–43.
Electronic Design, vol. 32, No. 10, May 1984 Hasbrouck Heights, New Jersey US, pp. 191–206, W. Meshach "Data--Flow IC Makes Short Work Of Tough Processing Chores".

*Primary Examiner*—Eric Coleman
*Attorney, Agent, or Firm*—Wolf, Greenfield & Sacks, P.C.

[57] ABSTRACT

There is disclosed an arithmetic unit which allows a combined multiply-add operation to be carried out in response to execution of a single computer instruction. This is particularly useful in a packed arithmetic environment, when a operand comprises a plurality of packed objects and the intention is to carry out the same arithmetic operation on respective pairs of objects in different operands. There is also provided a computer and a method of operating a computer to effect the combined multiply-add operation.

13 Claims, 4 Drawing Sheets

PROCESSOR & MEMORY

PACKED UNIT

OBVIOUS PACKED ARITHMETIC

FIG. 3
SYMBOLS

| SYMBOL | OPERATION |
|---|---|
| ▷ | ARITHMETIC LOGIC UNIT. COMBINES THE TWO SOURCE VALUES IN SOME MANNER TO PRODUCE A RESULT. |
| → \| R[3] \| R[2] \| R[1] \| R[0] \| → → → → ↑ | BUFFER. THIS PARTICULAR ONE HAS AN INPUT WHICH IS UNSEPARATED AND FOUR SEPARATED OUTPUTS, EACH TAKING ONE QUARTER OF THE INPUT SIGNALS. IT ALSO HAS AN OUTPUT ENABLE INPUT. |
| (multiplexer symbol) | MULTIPLEXER. THE OUTPUT CONSISTS OF ONE OF THE TWO INPUT SIGNALS. WHEN THE CONTROL SIGNAL IS NOT ASSERTED, THE UNSHADED INPUT SIGNAL IS OUTPUT. WHEN THE CONTROL SIGNAL IS ASSERTED, THE SHADED INPUT SIGNAL IS OUTPUT. |
| (changeover switch symbol) | CHANGEOVER SWITCH. EACH OF THE TWO OUTPUTS CONSISTS OF ONE OF THE INPUT SIGNALS. WHEN THE CONTROL SIGNAL IS NOT ASSERTED, THE UNSHADED INPUT GOES TO THE UNSHADED OUTPUT AND THE SHADED INPUT GOES TO THE SHADED OUTPUT. WHEN THE CONTROL SIGNAL IS ASSERTED, THE OUTPUTS SWAP OVER. |

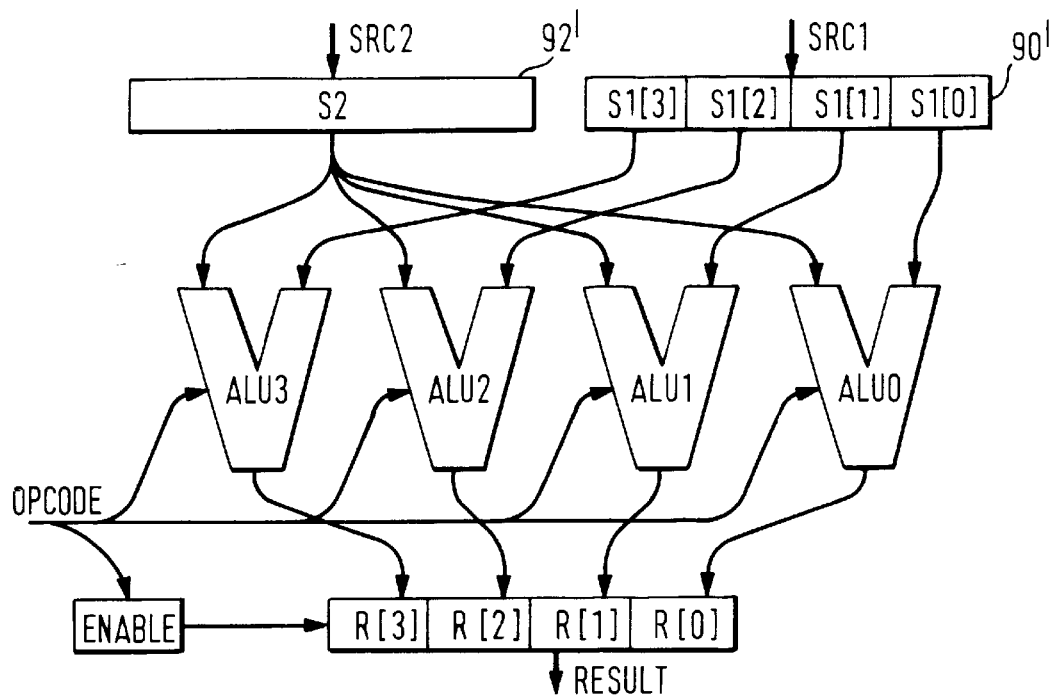
FIG. 5
OBVIOUS PACKED ARITHMETIC WITH UNPACKED OPERAND
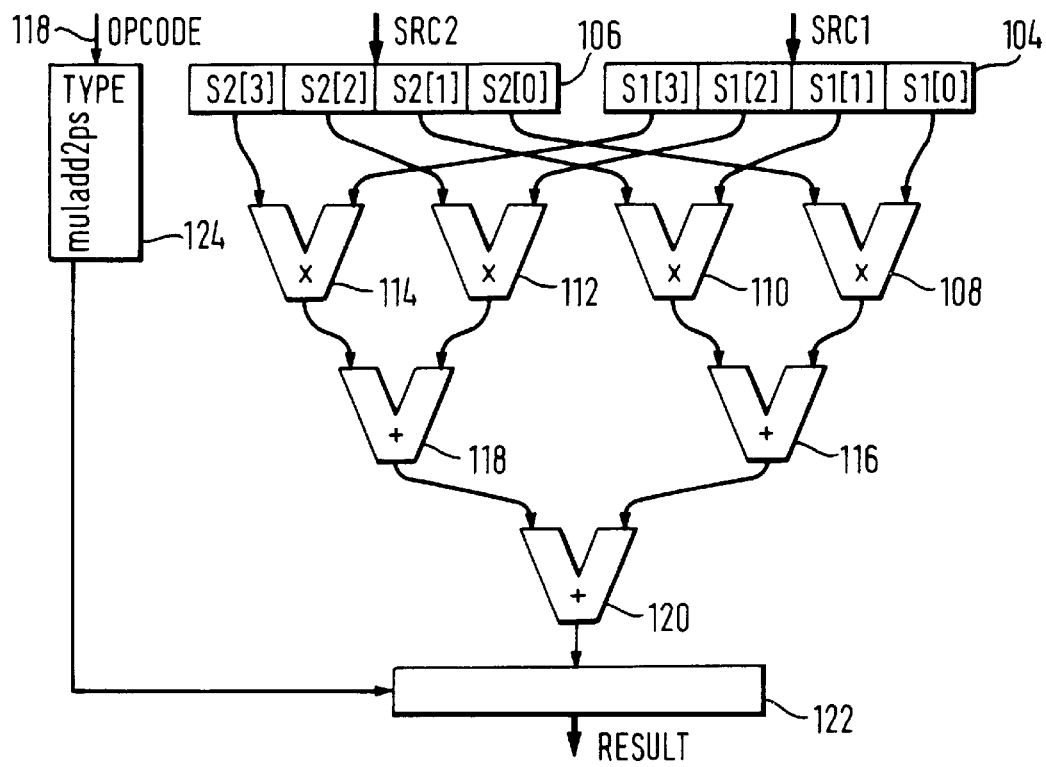
FIG. 6 MULTIPY ADD 5,859,789

ARITHMETIC UNIT

FIELD OF THE INVENTION

This invention relates to an arithmetic unit for use in a computer system.

BACKGROUND TO THE INVENTION

Arithmetic units are those which carry out an arithmetic operation in response to execution of an arithmetic instruction. Such instructions include an add instruction, a multiply instruction, a divide instruction and a subtract instruction. It is common to have in a computer system a so-called ALU (arithmetic logic unit) which is capable of implementing any one of these arithmetic instructions.

There are frequent occasions when it is required to multiply together pairs of objects and to add together the resulting products. This is presently done by effecting a multiplication operation on each pair of objects, storing the results of the multiplication operations in a register file and subsequently executing an addition instruction which recalls the earlier generated results from the register file and adds them together, finally loading the result back to the register file. One problem with this arrangement is that the length of the words resulting from the multiplication operations are much longer than the original operands. For example, the multiplication together of two 16 bit objects will result in a 32 bit word. It is therefore necessary to have available register capacity to store these results. One way round this problem which is currently used is to introduce rounding to reduce the word lengths prior to storage. This however can introduce rounding errors and can result in the multiplication not being carried out to adequate precision.

Another problem is the requirement to execute two instructions, a multiplication instruction followed by an add instruction. Not only do these instructions take up space in the instruction sequence stored in memory but they take time to execute.

SUMMARY OF THE INVENTION

According to one aspect of the present invention there is provided an arithmetic unit for executing an instruction to multiply together n pairs of objects and to add together the resulting products, said objects being represented by sub-strings of respective first and second data strings, the arithmetic unit comprising:

input buffer means for holding said first and second data strings;

a plurality (n) of multiplication circuits for simultaneously multiplying together respective pairs of objects, each multiplication unit having a pair of inputs for receiving respective objects defined by sub-strings of each of the first and second data strings and providing an output;

addition circuitry connected to receive the outputs of the multiplication circuits and operable to add together the resulting products of multiplication of the respective pairs of objects to generate a result; and output buffer means for holding the result.

This allows a combined multiply-add operation to be carried out in response to execution of a single instruction. It also has the advantage that the length of the result will always be less than the length of one of the data strings. Therefore, it can be ensured that the length of the result will not exceed the available capacity of the register for storing the result. This is particularly useful in a packed arithmetic environment, where an operand comprises a plurality of packed objects and the intention is to carry out the same arithmetic operation on respective pairs of objects in different operands. The first and second data strings can constitute a single operand or can be separate operands.

In the preferred embodiment, the addition circuitry comprises a first set of adder circuits each arranged to add together the outputs of a distinct two of said n multiplication circuits, and a further adder circuit arranged to add together outputs of each of the first set of adder circuits to provide said result.

In the described embodiment, the input buffer means comprises first and second input buffers each arranged to hold a respective one of the first and second data strings. However, only one input buffer is needed in the case where pairs of objects within an operand are to be multiplied together. It will readily be apparent that it is an advantage of the invention that the output buffer means can have a capacity which is less than the input buffer means.

The invention also provides a computer comprising a processor, memory and data storage circuitry for holding data strings each comprising n sub-strings representing respective objects, wherein said processor comprises an arithmetic unit as defined above and wherein there is stored in said memory a sequence of instructions comprising at least an instruction to multiply together n pairs of objects and to add together the resulting products, said instruction being executed by the arithmetic unit.

The data storage circuitry can comprise a plurality of register stores each having a predetermined bit capacity matching the length of each of the data strings.

One particularly useful application of the combined multiply-add instruction described herein is to multiply a vector by a matrix. Thus, the invention further provides a method of operating a computer to multiply a vector by a matrix wherein the vector is represented by a vector data string comprising a plurality of substrings each defining vector elements and wherein the matrix is represented by a set of matrix data strings each comprising a plurality of sub-strings defining matrix elements, the method comprising selecting each of said matrix data strings in turn and executing for each selected data string a single instruction which:

loads the selected data string into an input buffer means of an arithmetic unit;

roads said vector data string into said input buffer means;

simultaneously multiplies respective pairs of vector elements and matrix elements of said data strings to generate respective products;

adds together said products; and generates a result.

For a better understanding of the present invention and to show how the same may be carried into effect, reference will now be made by way of example to the accompanying drawings.

BRIEF DESCRIPTION OF THE DRAWINGS

FIG. 3 shows the meaning of symbols used in the figures;

FIG. 5 is a block diagram of an obvious packed arithmetic unit which operates on a packed source operand and an unpacked source operand; and FIG. 6 shows a multiply-add unit.

DESCRIPTION OF THE PREFERRED EMBODIMENT

Figure 1:
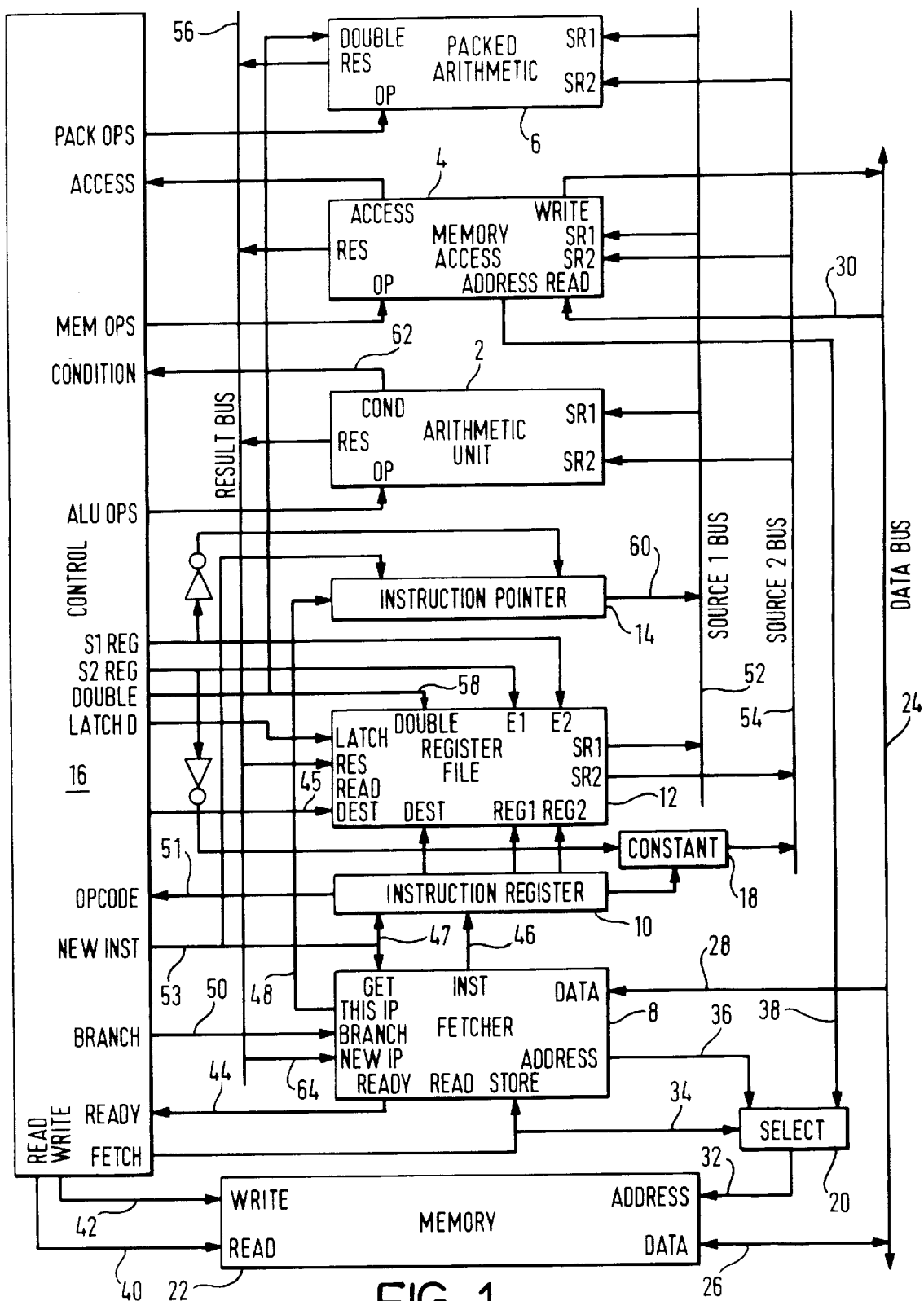
FIG. 1 is a block diagram of a processor and memory of a computer.

FIG. 1 shows a processor in accordance with one embodiment of the present invention. The processor has three execution units including a conventional arithmetic unit 2 and a memory access unit 4. In addition there is a packed arithmetic unit 6. The processor also includes an instruction fetcher 8, an instruction register 10, a register file 12 and an instruction pointer 14 all of which operate under the control of a control unit 16 of the processor. The register file comprises a set of registers each having a predetermined bit capacity and each being addressable with a single address. It is not possible to address individual locations within a register. When a register is accessed, the entire contents of the register are concerned. The processor further includes a constant unit 18 and a select unit 20. The constant unit 18 and select unit 20 are also operated under the control of the control unit 16. The processor operates in conjunction with a memory 22 which holds instructions and data values for effecting operations of the processor. Data values and instructions are supplied to and from the memory 22 via a data bus 24. The data bus 24 supplied data values to and from the memory 22 via a memory data input 26. The data bus 24 also supplies data to the instruction fetcher 8 via a fetcher data input 28 and to the memory access unit 4 via a memory access read input 30. The memory is addressed via the select unit 20 n address input 32. The select unit 20 is controlled via a fetch signal 34 from the control unit 16 to select an address 36 from the fetcher 8 or an address 38 from the memory access unit 4. Read and write control lines 40,42 from the control unit 16 control read and write instructions to and from the memory 22. The instruction fetcher 8 fetches instructions from the memory 22 under the control of the control unit 16 as follows. An address 36 from which instructions are to be read is provided to the memory 22 via the select unit 20. These instructions are provided via the data bus 24 to the fetcher data input 28. When the instruction fetcher has fetched its next instruction, or in any event has a next instruction ready, it issues a Ready signal on line 44 to the control unit 16. The instruction which is to be executed is supplied to the instruction register 10 along instruction line Inst 46 and held there during its execution. The instruction pointer 14 holds the address of the instruction being executed supplied to it from the fetcher 8 via instruction pointer line 48. A Get signal 47 responsive to a New Inst signal 53 from the control unit 16 causes the instruction register 10 to store the next instruction on Inst line 46 and causes the fetcher 8 to prepare the next instruction. The New Inst signal 53 also causes the instruction pointer 14 to store the address of the next instruction. A branch line 50 from the control unit 16 allows the instruction fetcher 8 to execute branches.

The instruction register 10 provides Source 1 and Source 2 register addresses to the register file 12 as Reg1 and Reg2. A result register address is provided as Dest. Opcode is provided to the control unit 16 along line 51. In addition, some instructions will provide a constant operand instead of encoding one or both source registers. The constant is provided by the constant unit 18. The instruction's source values are provided on Source 1 and Source 2 busses 52,54 by the appropriate settings of the S1 Reg and S2 Reg signals at inputs E1,E2. The correct execution unit is enabled by providing the appropriate values for Pack Ops, Mem Ops and ALU Ops signals from the control unit 16 in accordance with the Opcode on line 51. The enabled unit will normally provide a result Res on a result bus 56. This is normally stored in the selected result register Dest in the register file 12. There are some exceptions to this.

Some instructions provide a double length result. These store the first part of the result in the normal way. In a subsequent additional stage, the second part of the result is stored in the next register in the register file 12 by asserting a Double signal 58.

Branches 50 need to read and adjust the instruction pointer 14. These cause the S1 Reg signal not to be asserted, and so the instruction pointer 14 provides the Source 1 value on line 60. The Source 2 value is provided in the normal way (either from a register in the register file 12, or the constant unit 18). The arithmetic unit 2 executes the branch calculations and its result is stored into the fetcher 8 on the New IP input 64, rather than the register file 12, signalled by the Branch line 50 from the control unit 16. This starts the fetcher from a new address.

Conditional branches must execute in two stages depending on the state of condition line 62. The first stage uses the Dest register as another source, by asserting a Read Dest signal 45. If the condition is satisfied, then the normal branch source operands are read and a branch is executed.

Calls must save a return address. This is done by storing the instruction pointer value in a destination register prior to calculating the branch target.

The computer described herein has several important qualities.

Source operands are always the natural word length. There can be one, two or three source operands.

The result is always the natural word length, or twice the natural word length. There is a performance penalty when it is twice the natural word length as it takes an extra stage to store and occupies two, rather than one, registers. For this computer, assume a natural word length of 64 bits. That is, each register in the register file has a predetermined capacity of 64 bits.

The execution units 2,4,6 do not hold any state between instruction execution. Thus subsequent instructions are independent.

Non-Packed Instructions

The arithmetic unit 2 and memory access unit 4, along with the control unit 16 can execute the following instructions of a conventional instruction set. In the following definitions, a register is used to denote the contents of a register as well as a register itself as a storage location, in a manner familiar to a person skilled in the art.

| | |
|---|---|
| mov | Move a constant or a register into a register. |
| add | Add two registers together and store the result in a third register (which could be the same as either of the sources) |
| sub | Subtract two registers and store the result in a third register |
| load | Use one register as an address and read from that location in memory, storing the result into another register |
| store | Use one register as an address and store the contents of another register into memory at the location specified by the address |
| cmpe | Compare two registers (or a register and a constant) for equality. If they are equal, store 1 into the destination register otherwise store zero |
| cmpge | Compare two registers (or a register and a constant) for orderability. If the second is not less than the first, store 1 into the destination register otherwise store zero |
| jump | Unconditional jump to a new location |
| jumpz | Jump to a new program, location, if the contents of a specified register is zero |

| | |
|---|---|
| jumpnz | Jump to a new program location, if the contents of a specified register is not zero |
| shr | Perform a bitwise right shift of a register by a constant or another register and store the result in a destination register. The shift is signed because the sign bit is duplicated when shifting. |
| shl | Perform a bitwise left shift of a register by a constant or another register and store the result in a destination register |
| or/xor | Perform a bit-wise logical operation (or/xor) on two registers and store result in destination register. |

Packed Unit

Figure 2:
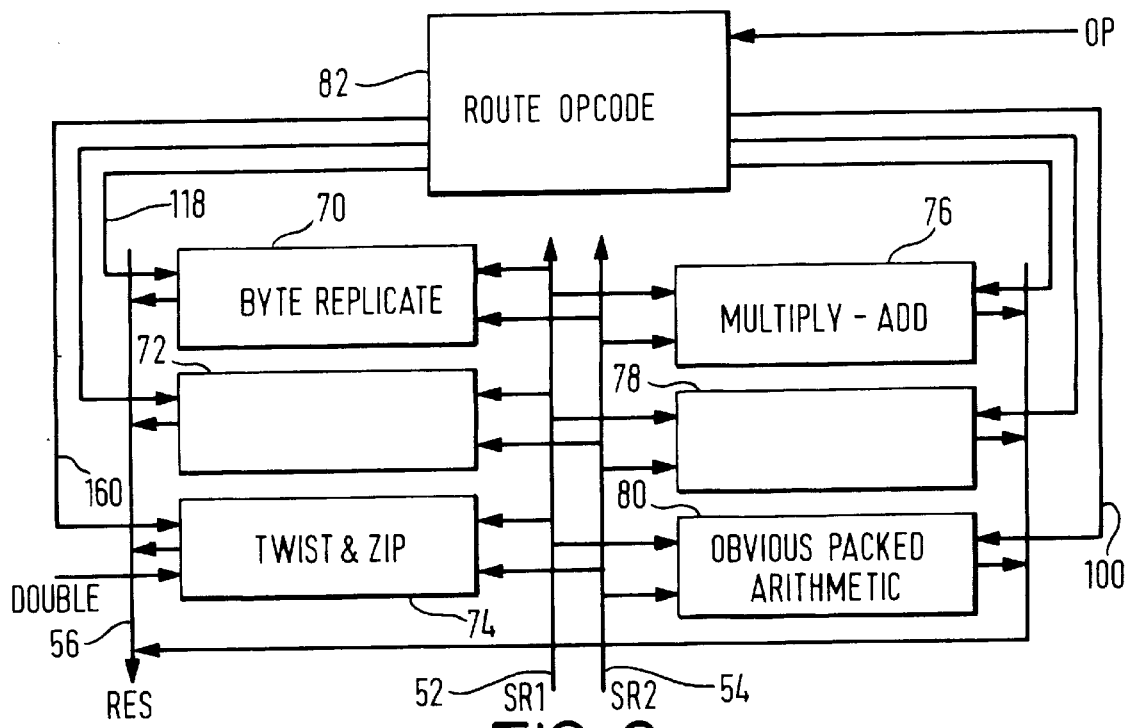
FIG. 2 is a block diagram of a packed arithmetic unit.

FIG. 2 shows in a block diagram the packed arithmetic unit 6. This is shown as a collection of separate units each responsible for some subset of packed arithmetic instructions. It is quite probable that another implementation could combine the functions in different ways. The units include a byte replicate unit 70, a twist and zip unit 74, an obvious packed arithmetic unit 80, a multiply-add unit 76 and other packed arithmetic units 72,78. Only the multiply-add unit and obvious packed arithmetic unit are described in detail herein. These are operated responsive to a route opcode unit 82 which selectively controls the arithmetic units 70 to 80. Operands for the arithmetic units 70 to 80 are supplied along the Source 1 and Source 2 busses 52,54. Results from the arithmetic units are supplied to the result bus 56. The op input to the route opcode unit 82 receives the Pack Ops instruction from the control unit 16 (FIG. 1). It will be appreciated that the operands supplied on the Source 1 and Source 2 busses are loaded into respective input buffers of the arithmetic units and the results supplied from one or two output buffers to one or two destination registers in the register file 12.

Obvious Packed Arithmetic

The obvious packed arithmetic unit 80 performs operations taking the two source operands as containing several packed objects each and operating on respective pairs of objects in the two operands to produce a result also containing the same number of packed objects as each source. The operations supported can be addition, subtraction, comparison, multiplication, left shift, right shift etc. As explained above, by addressing a register using a single address an operand will be accessed. The operand comprises a plurality of objects which cannot be individually addressed.

FIG. 3 shows the symbols used in the diagrams illustrating the arithmetic units of the packed arithmetic unit 6.

Figure 4:
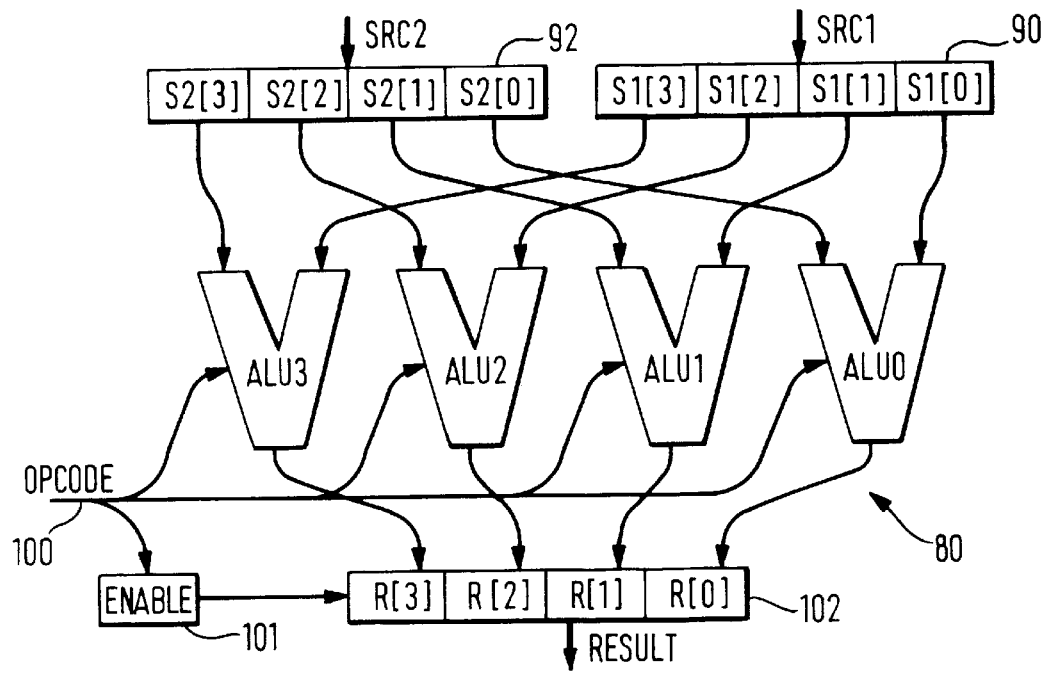
FIG. 4 is a block diagram of an obvious packed arithmetic unit operating on two packed source operands.

FIG. 4 shows an obvious packed arithmetic unit which can perform addition, subtraction, comparison and multiplication of packed 16 bit numbers. As, in this case, the source and result bus widths are 64 bit, there are four packed objects, each 16 bits long, on each bus.

The obvious packed arithmetic unit 80 comprises four arithmetic logical units ALU0–ALU3, each of which are controlled by opcode on line 100 which is derived from the route opcode unit 82 in FIG. 3. The 64 bit word supplied from source register 1 SRC1 contains four packed objects S1[0]–S1[3]. The 64 bit word supplied from source register 2 SRC2 contains four packed objects S2[0]–S2[3]. These are stored in first and second input buffers 90,92. The first arithmetic logic unit ALU0 operates on the first packed object in each operand, S1[0] and S2[0] to generate a result R[0]. The second to fourth arithmetic logic units ALU1–ALU3 similarly take the second to fourth pairs of objects and provide respective results R[1] to R[3]. These are stored in a result buffer 102. The result word thus contains four packed objects. An enable unit 101 determines if any of the unit should be active and controls whether the output buffer asserts its output.

The instructions are named as follows:

| | |
|---|---|
| add2p | Add each respective S1[i] to S2[i] as 2's complement numbers producing R[i]. Overflow is ignored. |
| sub2p | Subtract each respective S2[i] from S1[i] as 2's complement numbers producing R[i]. Overflow is ignored. |
| cmpe2p | Compare each respective S1[i] with S2[i]. If they are equal, set R[i] to all ones; if they are different, set R[i] to zero. |
| cmpge2ps | Compare each respective S1[i] with S2[i] as signed 2's complement numbers. If S1[i] is greater than or equal to S2[i] set R[i] to all ones; if S1[i] is less than S2[i] set R[i] to zero. |
| mul2ps | Multiply each respective S1[i] by S2[i] as signed 2's complement numbers setting R[i] to the least significant 16 bits of the full (32 bit) product. |

Some obvious packed arithmetic instructions naturally take one packed source operand and one unpacked source operand. FIG. 5 shows such a unit.

The contents of the packed arithmetic unit of FIG. 5 are substantially the same as that of FIG. 4. The only different is that the input buffer 92' for the second source operand receives the source operand in unpacked form. The input buffer 92' receives the first source operand in packed form as before. One example of instructions using an unpacked source operand and a packed source operand are shift instructions, where the amount to shift by is not packed, so that the same shift can be applied to all the packed objects. Whilst it is not necessary for the shift amount to be unpacked, this is more useful.

| | |
|---|---|
| shl2p | Shift each respective S1[i] left by S2 (which is not packed), setting R[i] to the result. |
| shr2ps | Shift each respective S1[i] right by S2 (which is not packed), setting R[i] to the result. The shift is signed, because the sign bit is duplicated when shifting. |

It is assumed that the same set of operations are provided for packed 8 bit and packed 32 bit objects. The instructions have similar names, but replacing the "2" with a "1" or a "4".

Multiply-Add Unit

FIG. 6 shows the multiply-add unit 76. The multiply-add unit comprises two input buffers 104,106 which receive respective operands marked SRC1 and SRC2. In the illustrated embodiment, each operand comprises four packed 16 bit objects S1[0] to S1[3], S2[0] to S2[3]. A first multiplication circuit 108 receives the first object S1[0] from the first input buffer and the first object S2[0] in the second input buffer and multiplies them together to generate a first multiplication result. A second multiplication circuit 110 receives the second object S1[] from the first buffer and the second object S2[1] from the second buffer and multiplies them together to generate a second multiplication result. A third multiplication circuit 112 receive the third objects S1[2],S2[2] from the first and second buffers and multiplies them together to generate a third multiplication result. A fourth multiplication circuit 114 receives the fourth objects S1[3],S2[3] from each buffer and multiplies them together to generate a fourth multiplication result. It will readily be appreciated that the multiplication circuits can take any suitable form, well known to a person skilled in the art. The first multiplication result and second multiplication result are supplied to respective inputs of a first adder circuit 116. The third and fourth multiplication results are supplied to respective inputs of a second adder circuit 118. Each of the first and second adder circuits 116,118 add together their respective inputs and supply the results to the input of a third adder circuit 120. The output of that adder circuit is held in an output buffer 122.

It will be appreciated that the multiplication operation carried out by the individual multiplication circuits will generate results having a "double length". That is, the multiplication together of two 16 bit objects will result in a 32 bit word. The addition of two 32 bit words will result in a word which has one or two bits more than 32 bits. This means that the capacity of the result buffer can safely be less than the capacity of one of the input buffers.

A type unit 124 receives opcode on line 118 derived from the route opcode unit 82 in FIG. 3. The type unit controls the output buffer 122.

The multiply-add unit is thus capable of executing a single instruction of the following form:

| muladd2ps | multiply and add the packed 16-bit signed 2's complement objects. |
|---|---|

The result of execution of that instruction will be to multiply together respective pairs of objects from two operands and to add together the results to provide a final result remaining within the original width of each operand. This allows the multiplication step to be carried out without incurring rounding errors, which normally happen as a result of multiplication steps to keep the word length within limits determined by the capacity of the available registers. The present multiply-add unit thus allows the multiplication to be performed at a high precision. Moreover, there is no need to incur rounding errors in the addition, because the length of the final result will inevitably be less than the capacity of one of the input buffers. As described earlier, the capacity of the input buffer will match the capacity of the available registers in the register file. Therefore, on execution of this instruction it can receive two operands, each occupying a single register and can guarantee that the result will occupy no more than one register. Conversely, because the capacity of the available register for the result is likely to be 64 bits, then it is certainly large enough to take the complete result and therefore prevent overflow areas from occurring.

It will readily be appreciated that it is possible to design similar multiply-add units for carrying out the combined multiply-add operation on different sizes of packed objects. It will also be readily appreciated that it is possible to hold the objects to be multiplied as part of a single operand in only one input buffer.

One example of use of the multiply-add unit is to evaluate the sum of products.

Sum of products is the evaluation of the following:

$$\sum_{i=0}^{N-1} A_i x B_i$$

In the illustrated example of FIG. 6, N=4, operand SRC1 is $A_1, A_2, A_3, A_4$ and operand SRC2 is $B_1, B_2, B_3, B_4$.

The multiply-add instruction can be used to effect this, and the sequence of instructions is shown in Annex A(i).

Another useful application of the multiply-add unit is to effect multiplication of a vector by a matrix. The vector is represented by a vector operand comprising a plurality of objects each defined in vector elements. The matrix is represented by a set of matrix operands, each comprising a plurality of objects defining matrix elements. Each matrix operand is taken in turn and loaded into one of the input buffers of the unit of FIG. 6. The vector operand is loaded into the other input buffer. The multiply-add unit therefore multiplies respective pairs of vector elements and matrix elements to generate respective products and adds together the products. The result is held in the result buffer 122.

An exemplary instruction sequence for multiplying a vector by a matrix is shown in Annex (Aii).

---

Annex A(i)

;sum of products of two vectors of N 16 bit objects
;R1 points to the first vector (A)
;R2 points to the second vector (B)
;R3 is the number of objects/4 in each vector

```
    mov       R0, 0              ;clear accumulator
loop:
    load      R4, R2             ;get 4 values from first vector
    load      R5, R2             ;get 4 values from second vector
    add       R2, R2, 8          ;increment vector pointer
    add       R2, R2, 8          ;increment vector pointer
    muladd2ps R6, R4, R5         ;multiply & add the 4 values
    add       R0, R0, R6         ;accumulate into running total
    sub       R3, R3, 1          ;decrement counter
    jumpnz    R3, loop           ;continue if incomplete
;the sum is in R0
```

---

Annex A(ii)

;Vector times a matrix.
;Rvec contains the vector, 4 16bit objects
;Rmat0 to Rmat3 contain the transposed matrix,
;      4 × 4 16bit objects
;Rres produces the result, 4 16bit objects

```
    muladd2ps   temp0, Rvec, Rmat0   ;first result
    muladd2ps   temp1, Rvec, Rmat1   ;second result
    muladd2ps   temp2, Rvec, Rmat2   ;third result
    muladd2ps   temp3, Rvec, Rmat3   ;fourth result
;the separate results must now be packed together
;to create a vector of 4 16bit values. This is
;most naturally done with zips, but as they are not
;in this disclosure, I have uses ands, shifts and ors,
;which requires more instructions.
    and         temp0, temp1, 65535  ;mask result 1 overflow
    and         temp1, temp1, 65535  ;mask result 2 overflow
    and         temp2, temp2, 65535  ;mask result 3 overflow
;result 3 does not need masking
;result 1 does not need shifting
    shl         temp1, temp1, 16     ;shift result 1 up
    shl         temp2, temp2, 32     ;shift result 2 up
    shl         temp3, temp3, 48     ;shift result 3 up
    or          temp0, temp0, temp1  ;combine result 1 & 2
    or          temp2, temp2, temp3  ;combine result 2 & 3
    or          Rres, temp0, temp2   ;combine
;Rres now holds the result
```

---

What is claimed is:

1. An arithmetic unit for executing an instruction to multiply together pairs of objects from two sets of objects and to add together the resulting products, at least one set of said objects being represented by sub-strings forming a data string being a packed operand, the arithmetic unit comprising:

input buffer constructed and arranged to hold said set of objects forming said packed operand;

a plurality of multiplication circuits constructed and arranged to multiply together the respective pairs of objects, each said multiplication circuit including a pair of inputs for receiving the respective objects and including an output;

addition circuitry connected to receive the outputs of the multiplication circuits and constructed and arranged to add together the resulting products of multiplication of the respective pairs of objects to generate a result; and an output buffer constructed and arranged to hold the result.

2. An arithmetic unit according to claim 1 wherein the addition circuitry comprises a first set of adder circuits each arranged to add together the outputs of a distinct two of said multiplication circuits, and a further adder circuit arranged to add together outputs of each of the first set of adder circuits to provide the result.

3. An arithmetic unit according to claim 1 or 2 wherein the input buffer comprises first and second input buffers each arranged to hold a respective one of the two set of objects.

4. An arithmetic unit according to claim 1 wherein the output buffer has a capacity which is less than the input buffer.

5. An arithmetic unit according to claim 1 wherein the input buffer is constructed and arranged to hold two sets of objects represented by sub-strings forming two data strings in form of two packed operands.

6. An arithmetic unit according to claim 1 wherein the input buffer is constructed and arranged to hold two sets of objects represented by sub-strings; wherein one set of sub-strings forms vector elements of a vector operand and the other set of sub-strings forms matrix elements of a matrix operand.

7. A computer comprising a processor, memory and data storage circuitry for holding data strings, wherein said processor comprises an arithmetic unit including an input buffer constructed and arranged to hold two sets of objects, wherein at least one set of objects is represented by sub-strings of a data string forming said packed operand;

a plurality of multiplication circuits constructed and arranged to multiply simultaneously together respective pairs of objects from said two sets of objects, each said multiplication circuit including a pair of inputs for receiving said respective objects and including an output;

addition circuitry connected to receive the outputs of the multiplication circuits and constructed and arranged to add together the resulting products of multiplication of the respective of objects to generate a result; and an output buffer constructed and arranged to hold the result, and wherein there is stored in said memory a sequence of instructions comprising at least an instruction to multiply together said pairs of objects from said two sets of objects and to add together the resulting products, said instruction being executed by the arithmetic unit.

8. A computer according to claim 7 wherein the data storage circuitry comprises a plurality of register stores each having a predetermined bit capacity matching the length of each of said data strings and being arranged to store said data strings as packed operands including objects represented by sub-strings.

9. A method of operating a computer to multiply together a vector and a matrix wherein the vector is represented by a vector data string comprising a plurality of sub-strings defining vector elements, the vector elements being objects arranged to form a packed operand, and wherein the matrix is represented by a set of matrix data strings each comprising a plurality of sub-strings defining matrix elements, the matrix elements being objects arranged to form packed operands, the method comprising selecting each of said matrix data strings in turn and executing for each selected data string a single instruction which:

loads the selected data string in form of packed source objects into an input buffer of an arithmetic unit;

loads said vector data string in form of packed source objects into said input buffer;

simultaneously multiplies respective pairs of vector elements and matrix elements of said data strings to generate respective products;

add together said products; and generates a result.

10. A method of executing an instruction for multiplying together pairs of objects from two sets of objects and adding together the resulting products, said method including:

providing two sets of objects to an input buffer, wherein at least one said set of objects being represented by sub-strings forming a data string in form of a packed operand;

supplying said objects to a plurality of multiplication circuits for multiplying together respective pairs of said objects from said two sets, each said multiplication circuit receiving the respective objects defined by said sub-strings at a pair of inputs and providing an output;

receiving the outputs of the multiplication circuits by addition circuitry for summing together the multiplication outputs to generate a result; and holding in an output buffer the result.

11. A method according to claim 10 wherein said summing in the addition circuitry includes summing pairs of outputs from the multiplication circuits in a first set of adder circuits and then summing pairs of outputs of each of the first set of adder circuits to provide the result.

12. A method according to claim 10 wherein both said sets of objects are represented by sub-strings forming two data strings in form of two packed operands.

13. A method according to claim 12 wherein one of the two packed operands is a vector operand including a plurality of said objects defining vector elements and the other of the two packed operands is a matrix operand including a plurality of objects defining matrix elements.

* * * * *